Dec. 16, 1952  J. E. ENGELS ET AL  2,621,535
SAFETY HAND BRAKE FOR TRACTORS
Filed May 1, 1950  2 SHEETS—SHEET 2
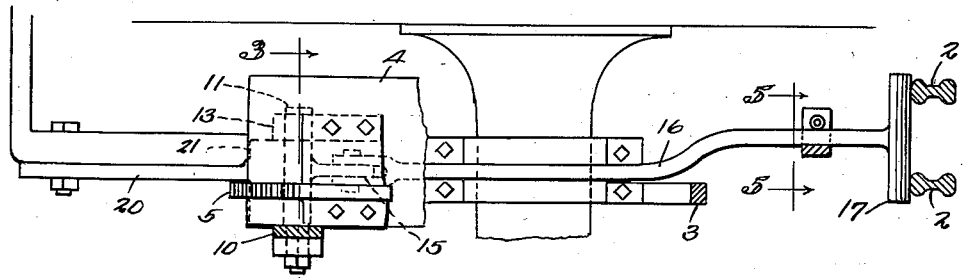
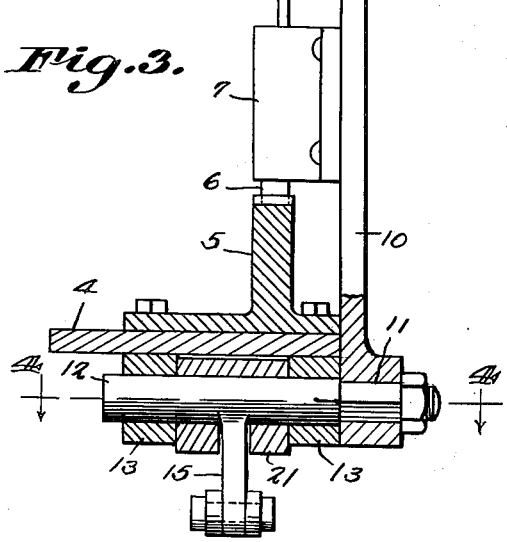
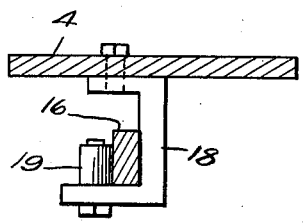
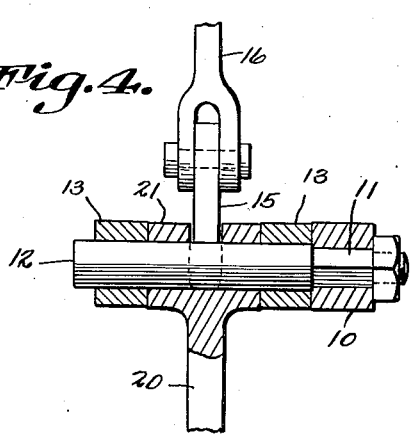
J. E. Engels
T. A. Engels
INVENTORS
BY *CA Snow & Co.*
ATTORNEYS.

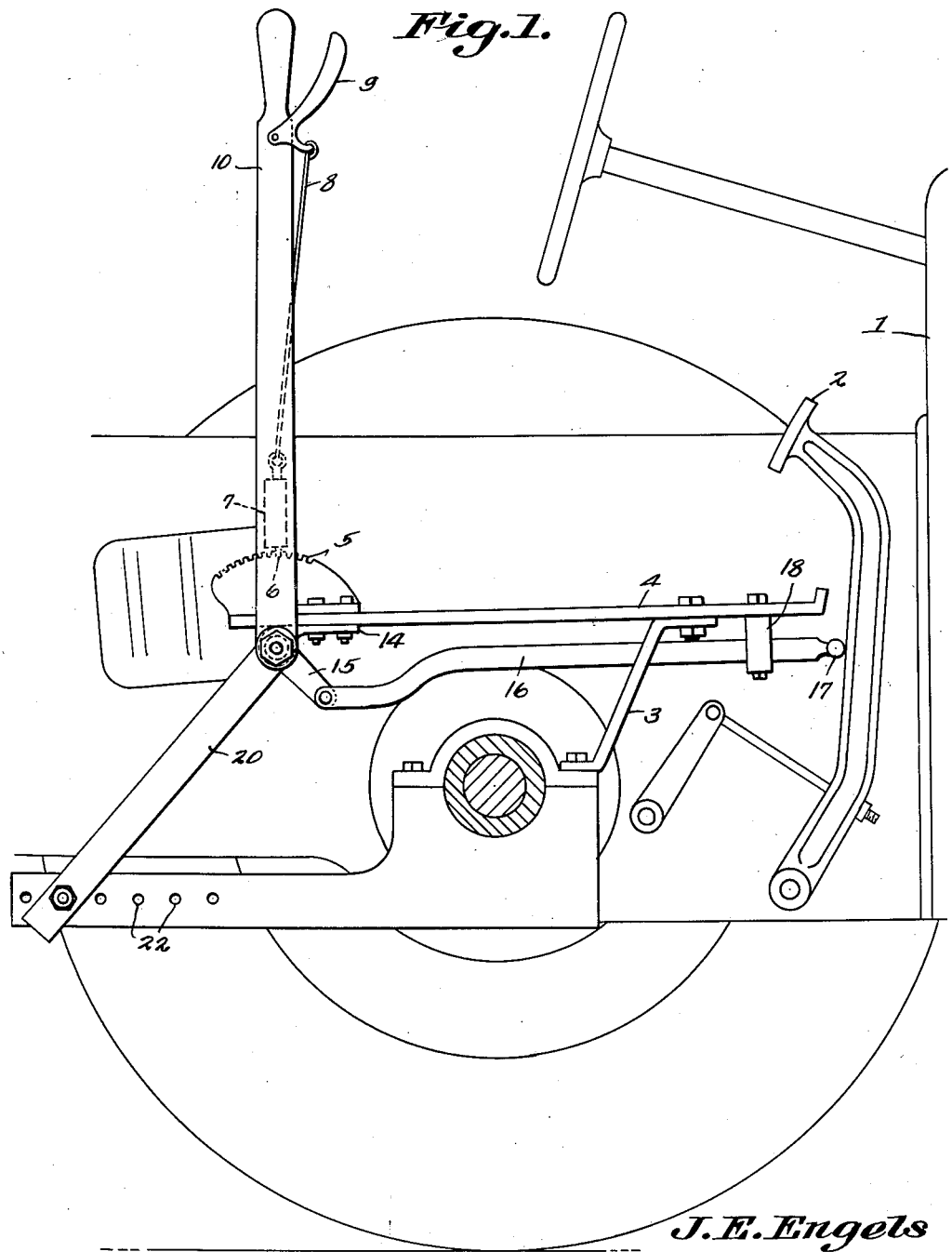

UNITED STATES PATENT OFFICE 2,621,535

SAFETY HAND BRAKE FOR TRACTORS

Joseph E. Engels and Thomas A. Engels,
Mineral Point, Wis.

Application May 1, 1950, Serial No. 159,328

1 Claim. (Cl. 74—481)

This invention relates to a safety hand brake for tractors.

Most tractors as presently constructed are provided with catches on the brake pedals, but these have proved very unreliable, and as a result, there is considerably chance of the tractor brakes being released when the tractor is parked with the motor running. For example, the tractor might be parked with the motor running while being used as a stationary power plant for a power saw or other power driven device.

The main object of the present invention is to provide a safety hand brake attachment which can be applied to a tractor already in use, and which is capable of being swiftly and easily operated to provide a positive lock for the brakes of the tractor.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Fig. 1 is a side elevational view.

Fig. 2 is a top plan view.

Fig. 3 is an enlarged section on line 3—3 of Fig. 2.

Fig. 4 is a section on line 4—4 of Fig. 3.

Fig. 5 is an enlarged section on line 5—5 of Fig. 2.

Referring to the drawings in detail, the tractor 1 is of conventional construction and is equipped with the brake pedals 2.

In accordance with the present invention we secure to the axle housing or some other suitable structural part of the tractor the annularly and upwardly extended front brace 3 to the upper end of which is rigidly secured the front portion of a horizontal elongated foot rest 4 having rigidly mounted on its rear end the upstanding toothed segment 5 between any of the teeth of which may be engaged a detent 7 mounted at the lower end of a reciprocable rod 8, said detent sliding in a fixed sleeve 7 secured to the side of the operating lever 10 of our safety device. Operation of the detent rod 8 is provided by the pivoted handle 9 pivotally mounted on the upper end of said lever 10.

At its lower end the pivoted lever 10 is formed with a non-circular opening receiving the non-circular end 11 of a rotatable shaft 12 journaled in spaced bearings 13 rigid with plates 14 fixedly secured to the underside of the rear end of the foot rest 4. Shaft 12 is rigid with the downwardly and forwardly extending short arm 15 straddled by and pivotally connected to a yoke formed on the rear end of the elongated locking rod 16 which may be upwardly and laterally offset, depending upon the particular make of the tractor, the front end of said locking rod 16 being formed with cross head 17 adapted to engage the spaced brake pedals 2 of the tractor.

The front end of the locking rod 16 is supported by a bracket 18 secured to the underside of the front portion of the foot rest 4, and provided with the roller 19 engaged by the locking rod 16 when said locking rod is reciprocated within the bracket 18.

For supporting the rear end of the device, we provide the rear brace 20 having at its upper end an apertured yoke 21 through which the shaft 12 extends, said yoke being disposed between the bearings 13 (see Fig. 3). The bottom end of the brace 20 is adjustably and fixedly connected to a structural part of the tractor, as for example the frame of the tractor, which is preferably formed with a longitudinal series of openings 22 in any of which can be positioned the fastening means whereby said rear brace is secured to the tractor.

The operation, it is thought, will be readily understood. The brake pedals 2 are used in the normal manner when the tractor is being driven, the locking rod 16 at this time being withdrawn or shifted to the left in Fig. 1. Assuming that the tractor is to be parked with the motor running, the operator depresses the brake pedals 2 to engage the brakes, which causes the brake pedals to pivot to the right in Fig. 1. He now grasps the operating lever 10 and handle 9, disengaging the detent 6 from the segment 5, and this permits the pivoted lever 10 to be pulled rearwardly or to the left in Fig. 1. The short arm 15 is thus swung forwardly, shifting the locking rod 16 to the right in Fig. 1 until said cross head 17 comes against the depressed brake pedals 2. Release of the handle 9 now engages the detent 6 in the segment, retaining the lever 10 in the position to which it has been shifted. This locks the rod 16 in the brake pedal-engaging position, and the tractor can now be parked with the motor running without danger of accidental release of the brakes.

When the tractor is again to be driven, it is necessary only to disengage the detent 6, shifting the pivoted lever 10 to the right in Fig. 1, and thus withdrawing the locking rod 16 from its brake pedal-engaging position. The brake pedals 2 can now once again be used in the usual manner.

What is claimed is:

In a tractor of the type having a horizontal foot rest, a brake, and a brake pedal connected to the brake and mounted below the foot rest to move about a horizontal axis in a vertical arcuate path which intersects the plane of the foot rest from an upwardly extending position in which the brake is released to a depressed position in which the brake is applied, means for holding the brake pedal depressed and the brake applied comprising an elongated push rod mounted intermediate its ends on the foot rest to move longitudinally in a substantially horizontal path, a cross head carried by the push rod adjacent one end thereof for movement by said push rod in a path which lies perpendicular to the horizontal axis and intersects the vertical arcuate path, a hand lever carried by the foot rest for movement about an axis which lies parallel to the horizontal axis, said hand lever being pivotally connected to the push rod for moving said push rod in the substantially horizontal path, a toothed segment carried by the foot rest and lying concentric about the parallel horizontal axis, and means carried by the hand lever for operatively engaging the quadrant and holding the push rod in a selected position relative to the brake pedal.

JOSEPH E. ENGELS.
THOMAS A. ENGELS.

REFERENCES CITED

The following references are of record in the file of this patent:

UNITED STATES PATENTS

| Number | Name | Date |
| --- | --- | --- |
| 1,509,638 | Clauson | Sept. 23, 1924 |
| 1,621,427 | Peasley | Mar. 15, 1927 |
| 1,711,929 | Drube | May 7, 1929 |
| 1,801,987 | Strand | Apr. 21, 1931 |
| 1,833,458 | Giuffre | Nov. 24, 1931 |
| 2,423,043 | Olstad | June 24, 1947 |
| 2,555,417 | Martin | June 5, 1951 |